United States Patent
Zang et al.

(10) Patent No.: US 8,600,425 B1
(45) Date of Patent: Dec. 3, 2013

(54) TCP-AWARE POWER CONTROL IN WIRELESS NETWORKS

(75) Inventors: Hui Zang, Cupertino, CA (US); Ashwin Sridharan, Sunnyvale, CA (US); Majid Ghaderi, Calgary, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 478 days.

(21) Appl. No.: 12/869,347

(22) Filed: Aug. 26, 2010

Related U.S. Application Data

(63) Continuation-in-part of application No. 12/706,847, filed on Feb. 17, 2010.

(51) Int. Cl.
*H04B 7/00* (2006.01)

(52) U.S. Cl.
USPC .......................................... 455/522

(58) Field of Classification Search
USPC ............... 455/522, 69, 67.11, 127.1, 13.4; 370/318, 320, 335, 340
See application file for complete search history.

(56) References Cited

PUBLICATIONS

J. P. Singh, Y. Li, N. Bambos, A. Bahai, B. Xu, and G. Zimmerman, "TCP performance dynamics and link-layer adaptation based optimization methods for wireless networks." In IEEE Transactions on Wireless Communications, May 2007. pp. 1864-1879, vol. 6, Issue No. 5, IEEE Computer Society, Washington, DC, USA.

D. Barman, I. Matta, E. Altman, and R. E. Azouzi, "TCP optimization through FEC, ARQ and transmission power trade offs." In Proc. Wired / Wireless Internet Communications, Feb. 2004. pp. 87-98, Springer, New York, NY USA.

M. Ghaderi, A. Sridharan, H. Zang, D. Towsley, and R. Cruz, "TCP-Aware Resource Allocation in CDMA Networks." In Proc. International Conference on Mobile Computing and Networks, Sep. 2006. pp. 215-226, ACM, New York, NY USA.

H. Zang, M. Ghaderi, A. Spridharan, "TCP-Aware Power Control in Wireless Networks." In Proc. International Conference on Network Protocols, Oct. 2009. pp. 334-343, IEEE Computer Society, Washington, DC, USA.

*Primary Examiner* — Sujatha Sharma

(57) ABSTRACT

A method, system, and medium are provided for controlling power usage in a wireless telecommunications network, the method comprising transmitting a pilot signal to a mobile station over a wireless channel, receiving a response that includes a signal-to-interference-and-noise ratio associated with said pilot signal, determining an instantaneous channel rate to be used for a subsequent data transmission to said mobile station based at least on said signal-to-interference-and-noise ratio, selecting a transmit power level for said data transmission; and transmitting data to said mobile station at said channel rate and said power level.

20 Claims, 8 Drawing Sheets

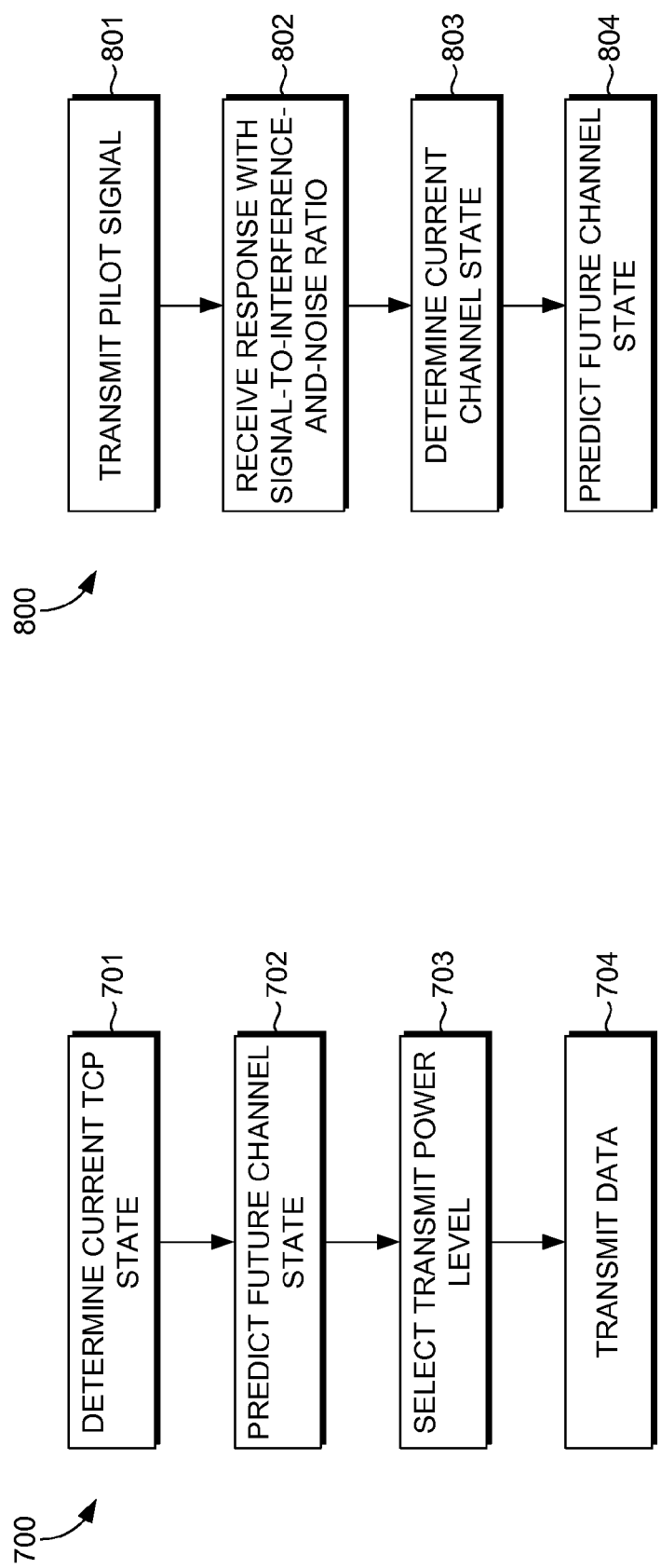

TCP-AWARE POWER CONTROL IN WIRELESS NETWORKS

CROSS-REFERENCE TO RELATED APPLICATIONS

This application is a continuation-in-part application of application Ser. No. 12/706,847 ("TCP-AWARE POWER CONTROL IN WIRELESS NETWORKS"), FILED Feb. 17, 2010, which is incorporated by reference herein in its entirety.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

At a high level, ways of controlling power usage in a wireless telecommunications network are provided. In one aspect, a wireless telecommunications base transceiver station performs a method of controlling power usage in a wireless telecommunications network. In one embodiment of this method, the transmit power for the base transceiver station is minimized consistent with maintaining acceptable forward error rates.

BRIEF DESCRIPTION OF THE SEVERAL VIEWS OF THE DRAWINGS

Illustrative embodiments of the present invention are described in detail below with reference to the attached drawing figures, and wherein:

FIG. 7 depicts a flow diagram of an exemplary method of transmitting data at a particular power level in accordance with an embodiment of the present invention;

FIG. 8 depicts a flow diagram of an exemplary method of predicting a future channel state in accordance with an embodiment of the present invention.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| BTS | Base Transceiver Station |
| CDMA | Code Division Multiple Access |
| EVDO | EVolution-Data Optimized |
| FER | Frame Error Rate |
| GSM | Global System for Mobile (Groupe Spécial Mobile) |
| HSDPA | High-Speed Downlink Packet Access |
| IP | Internet Protocol |
| LTE | Long-Term Evolution |
| SINR | Signal-to-Interference-and-Noise Ratio |
| TCP | Transmission Control Protocol |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media include media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
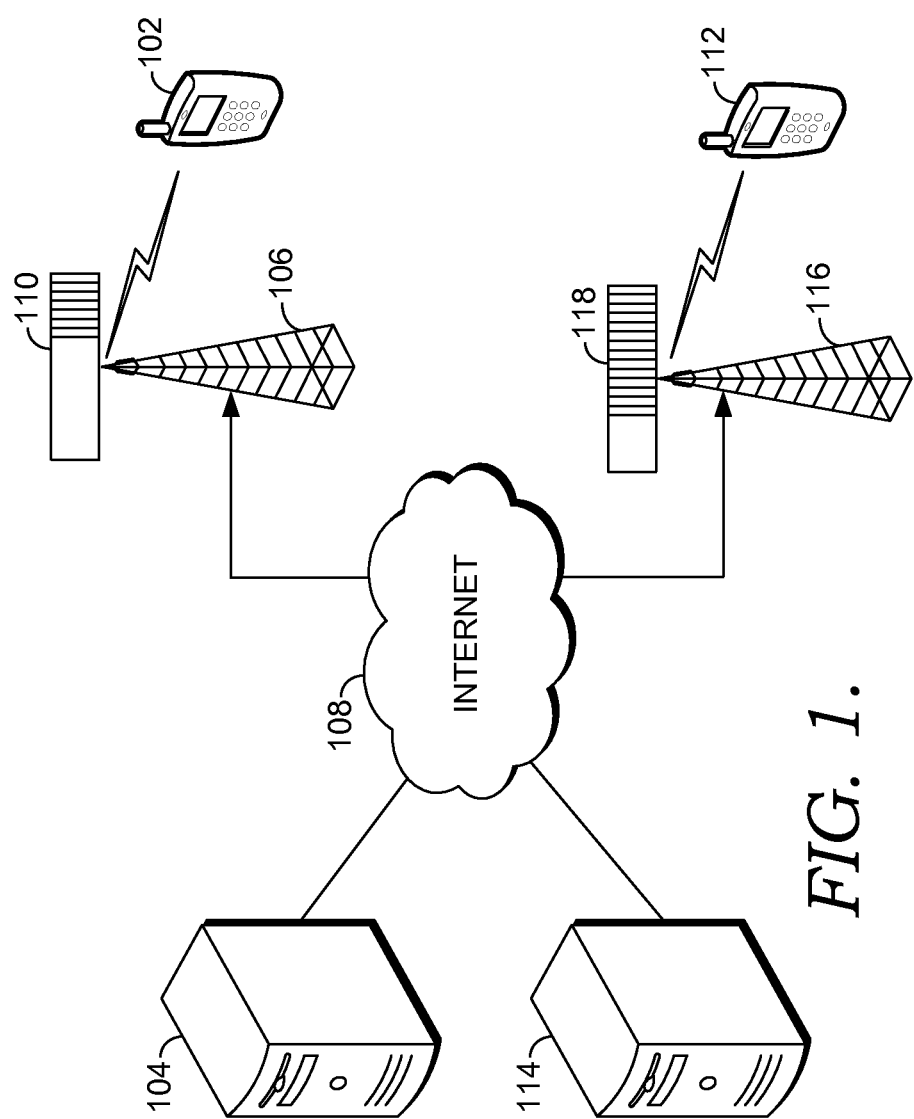
FIG. 1 depicts a block diagram of an exemplary system in accordance with one embodiment of the present invention.

Turning now to FIG. 1, a block diagram of an exemplary system in accordance with one embodiment of the present invention is presented. A first mobile device 102 communicates with a content provider 104 via a BTS 106 and the Internet 108. In one embodiment, mobile device 102 takes the form of a smartphone; in another embodiment, it takes the form of a laptop computer. Other embodiments are possible without departing from the scope of the claims below. Content provided by content provider 104 can take the form of web pages, email services, and other IP data services. BTS 106 communicates wirelessly with mobile device 102, and maintains a queue 110 of data to transmit wirelessly to mobile device 102. In one embodiment, data in queue 110 may take the form of IP packets containing TCP packets, UDP packets, or other transport-layer protocols. In another embodiment, another network-layer protocol is used; in a third embodiment, no network layer protocol is used, and the transport layer is sent directly. In one embodiment, mobile device 102 and BTS 110 communicate via CDMA; other embodiments include EVDO, GSM, HSPDA, LTE, WiFi, and WiMax. This list is intended to be illustrative rather than exhaustive and other wireless protocols are possible without departing from the scope of the claims below.

Similarly, a second mobile device 112 communicates with a second content provider 114 via BTS 116 and Internet 108, and BTS 116 maintains a queue 118 of data to transmit wirelessly to mobile device 112. Mobile device 112 may take the same form as mobile device 102, or a different form; similarly, the type of data sent, the network, transport, and wireless protocols may be the same as those used by mobile device 102 or different.

The maximum rate of data communication between mobile device 102 and BTS 106 is dependent on the signal-to-interference-and-noise ratio (SINR) of the wireless channel in use, as is the maximum rate of data communication between mobile device 112 and BTS 116. Thus, BTS 106 could increase the data rate of its communication with mobile device 102 by transmitting at increased power, thus increasing the "signal" portion of the SINR. However, increasing transmit power in the channel between mobile device 102 and BTS 106 also increases the "interference" portion of the SINR of the channel between mobile device 112 and BTS 116. Thus the optimal data rates for the entire network occur when each BTS transmits at the minimum power necessary to achieve the necessary SINR for a given data rate. However, this power is dependent on the power of all other BTSs transmitting within interference range as well as noise from outside the system and thus cannot be determined accurately in advance. Therefore, some data packets are lost regardless of the transmit power level used; present systems attempt to minimize this loss by choosing a single, fixed transmit power level for each communication with a given mobile device, targeted at an acceptably small FER for a given data rate.

Figure 2:
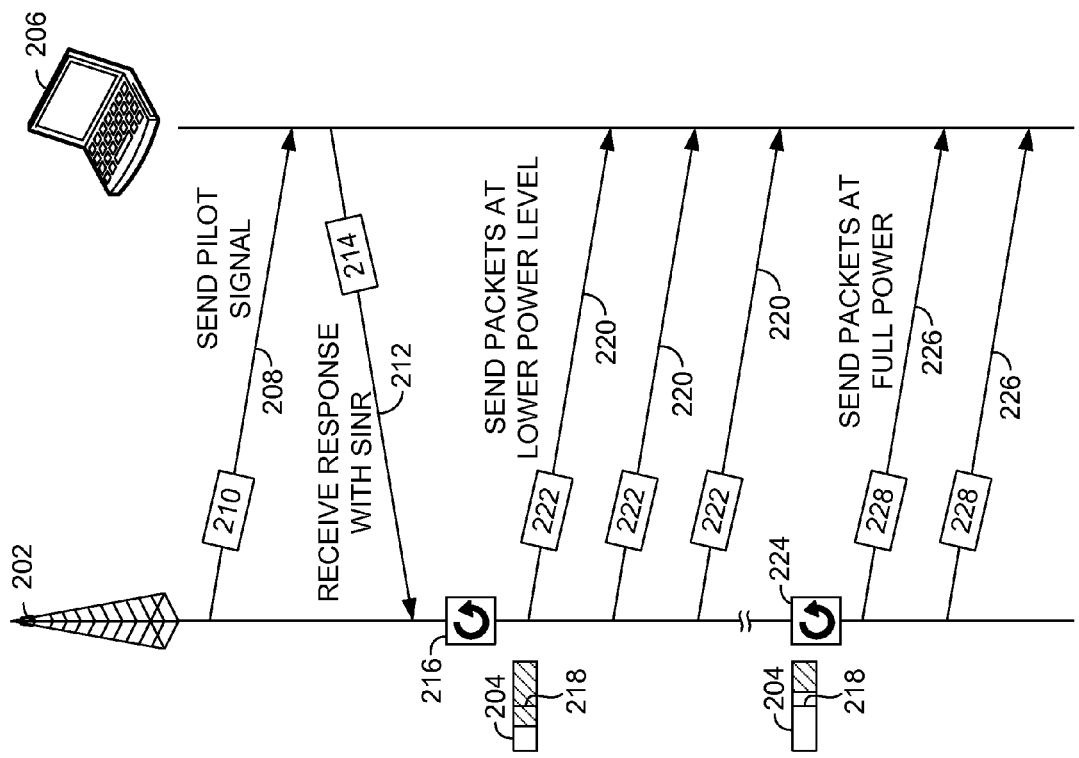
FIG. 2 depicts an illustrative data flow diagram that shows data flowing in accordance with one embodiment of the present invention.

Turning now to FIG. 2, a data flow diagram showing data flowing in accordance with the present invention. BTS 202 has a queue 204 of data to transmit to mobile device 206. BTS 202 corresponds to BTS 106, queue 204 corresponds to queue 110, and mobile device 206 corresponds to mobile device 102. At step 208, BTS 202 transmits a pilot signal 210 to mobile device 206. In one embodiment, pilot signal 210 is transmitted at full power. At step 212, mobile device 206, having received pilot signal 210, transmits a reply 214 to BTS 202 that includes the SINR associated with its reception of pilot signal 210.

At step 216, BTS 202, having received reply 214, determines the data rate for subsequent transmissions. In one embodiment, this data rate is chosen to be the highest data rate the reported SINR will support for a fixed FER rate. A plurality of transmit power levels are then determined, and one is selected. In one embodiment, this plurality is two distinct power levels; in another embodiment, the plurality is three distinct power levels. Other numbers of power levels are possible without departing from the scope of the claims below. Each of these distinct power levels is associated with a queue length threshold 218. In one embodiment, higher power levels are associated with shorter lengths of queue 204; the lowest power level associated with a threshold below the current length of queue 204 is then selected.

At step 220, one or more packets 222 are transmitted at the selected power level. This step continues until the length of queue 204 crosses a threshold such as threshold 218. At step 224, BTS 202 determines that the length of queue 204 has dropped below threshold 218 and chooses a new power level. In one embodiment, the lowest power level associated with a threshold below the new length of queue 204 is selected. At step 226, one or more packets 228 are transmitted at this new power level. In one embodiment, this process of sending packets and adjusting the transmit power level whenever the current queue length crosses a threshold such as threshold 218 is repeated until no more data remains to be sent from BTS 202 to mobile device 206.

Figure 3:
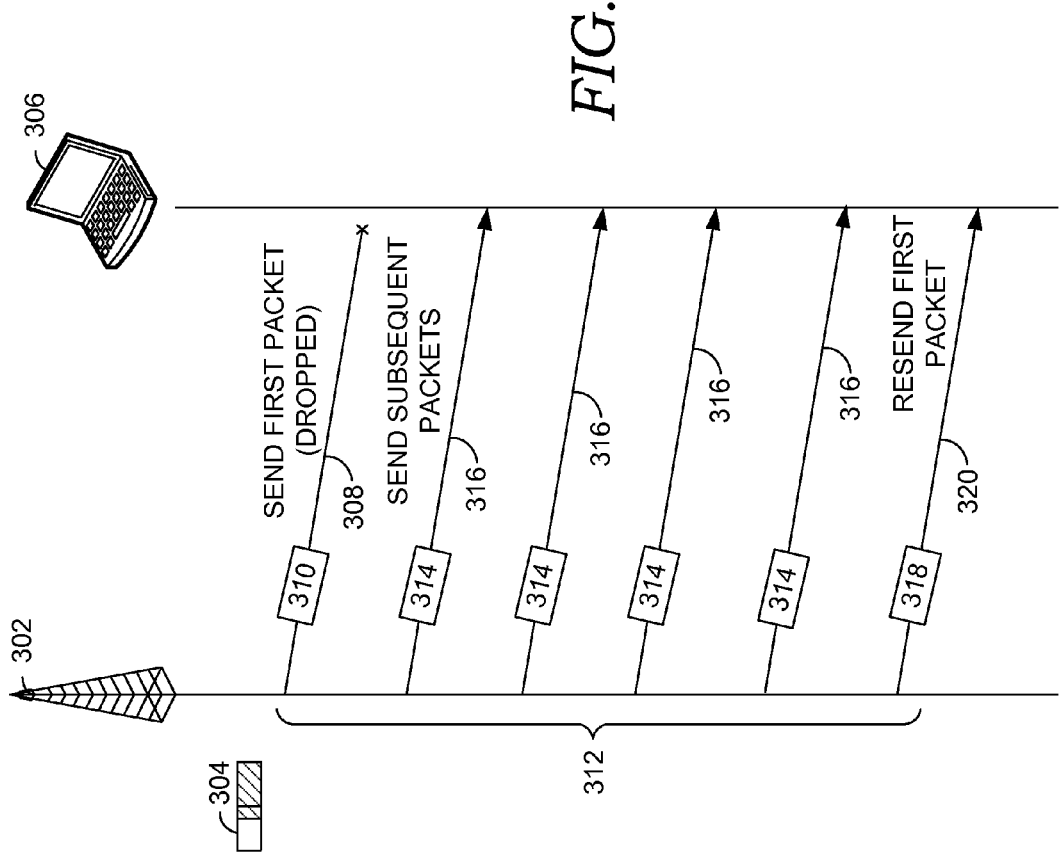
FIG. 3 depicts an illustrative data flow diagram showing the effects of a wireless packet drop in the case that the BTS has a full transmit queue.

Turning now to FIG. 3, an illustrative data flow diagram showing the effects of a wireless packet being lost in the course of transmission from a BTS 302 with transmit queue 304 to a mobile device 306 in the case that transmit queue 304 is long is presented. BTS 302 corresponds to BTS 202, transmit queue 304 corresponds to transmit queue 204, and mobile device 306 corresponds to mobile device 206. The transmission process initially proceeds as in FIG. 2.

At step 308, however, BTS 302 transmits a packet 310, which is not correctly received by mobile device 306. This loss is not detected until an interval 312 has elapsed; however, since queue 304 is long, one or more packets 314 making up the remainder of the data to be transmitted can be sent at step 316 before the loss of packet 310 has been detected. After interval 312 has elapsed, the loss of packet 310 is detected and a retransmission 318 of packet 310 occurs at step 320. During this time, the queue is non-empty and hence the BTS is able to continuously transmit packets, thereby maintaining application throughput at a high level.

Figure 4:
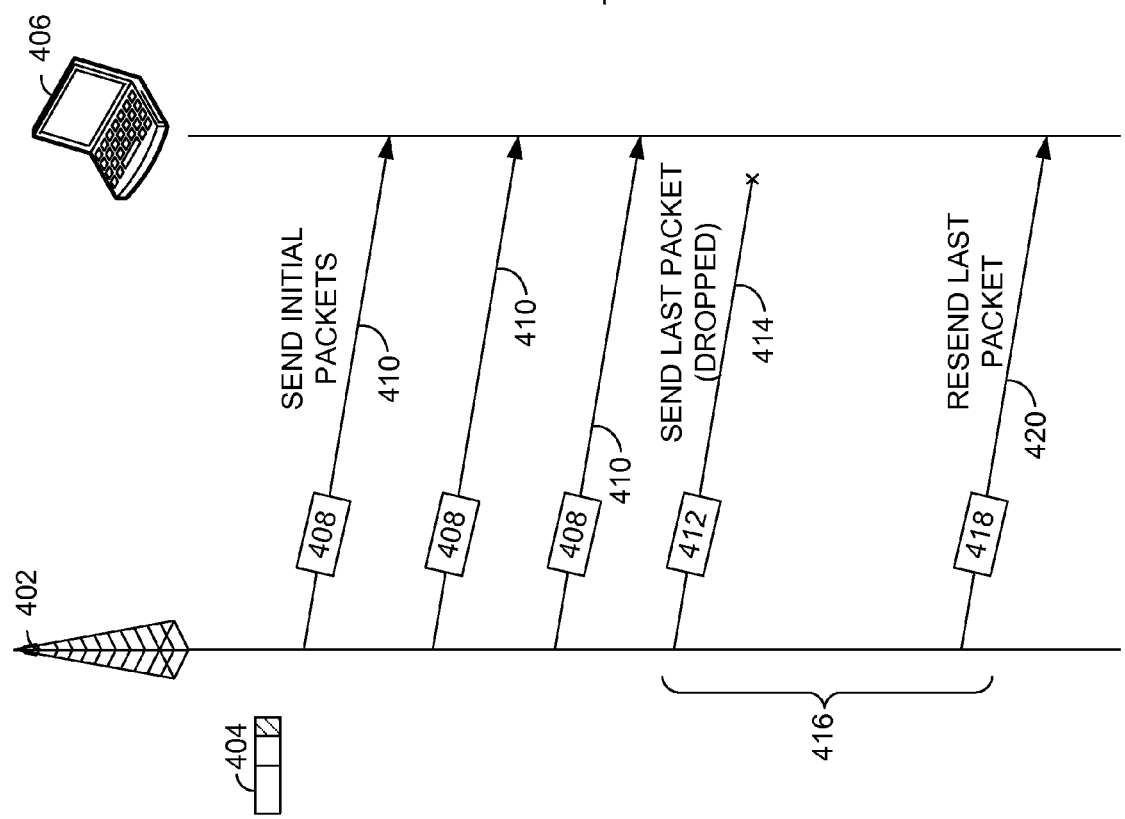
FIG. 4 depicts an illustrative data flow diagram showing the effects of a wireless packet drop in the case that the BTS has an empty transmit queue.

Turning now to FIG. 4, an illustrative data flow diagram showing the effects of a wireless packet being lost in the course of transmission from a BTS 402 with transmit queue 404 to a mobile device 406 in the case that transmit queue 404 is empty is presented. BTS 402 corresponds to BTS 202, transmit queue 404 corresponds to transmit queue 204, and mobile device 406 corresponds to mobile device 206. As before, the transmission initially proceeds as in FIG. 2.

In this case, however, instead of the first packet of the transmission (i.e., packet 310) being lost, the initial packets 408 of the transmission are sent successfully at step 410, and packet 412 is unsuccessfully transmitted at step 414. As in FIG. 3, this loss is not detected for an interval 416; however, unlike the case of FIG. 3, transmit queue 404 is now empty, so no packets can be sent until interval 416 has elapsed and a retransmission 418 of lost packet 412 occurs at step 420. Hence during the interval 416, the queue is empty, so no packets can be transmitted, and application throughput is significantly lowered. Compare this to FIG. 3, where a packet drop with a long queue of packets to transmit did not adversely affect application throughput.

Figure 5:
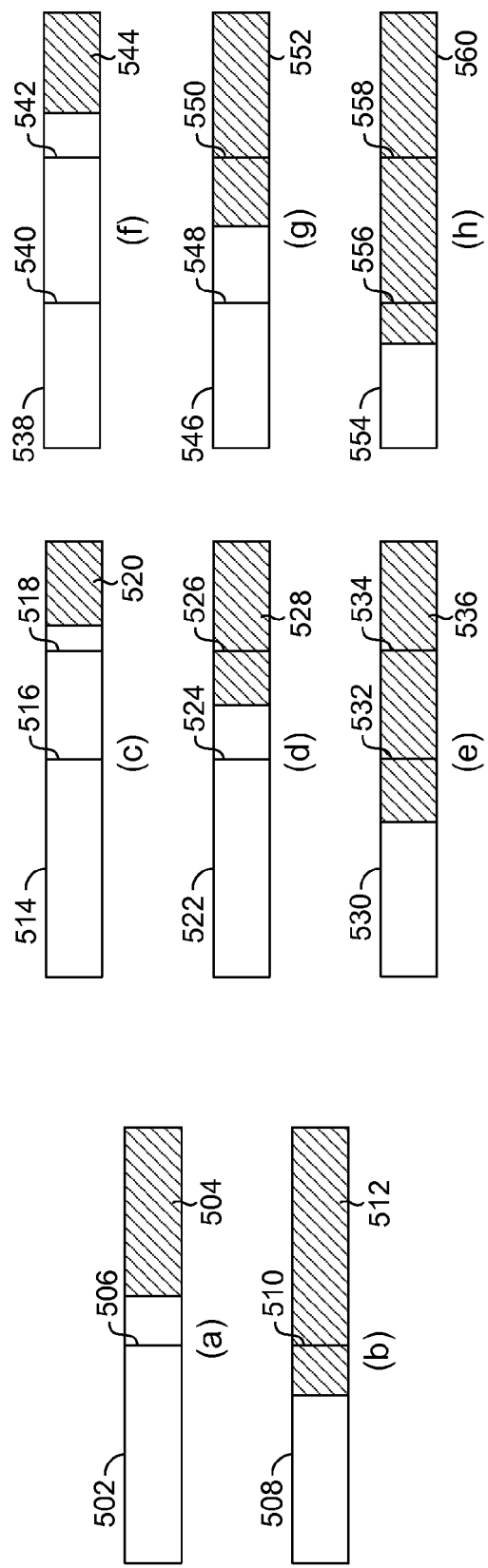
FIGS. 5A-5H depict transmit queues with various amounts of data in them and various transmit power level thresholds.

FIGS. 3 and 4, illustrate that packet loss can be considerably more costly when the transmit queue is short than when it is long. Accordingly, more effort should be expended to ensure that packets arrive correctly in the former case than in the latter case. In a wireless telecommunications environment, this translates to increasing transmission power. FIG. 5 depicts a series of strategies for setting a threshold queue length and corresponding transmission power. FIG. 5A shows a transmit queue 502 containing some quantity of data 504. In this embodiment, the threshold 506 is set at one-half of the maximum queue length. Since the amount of data in the queue 504 is less than the threshold 506, a higher power level is used. In one embodiment, this higher power level is maximum power.

FIG. 5B depicts a transmit queue 508, corresponding to queue 502, with threshold 510, corresponding to threshold 506. In this case, however, the amount of data in the queue 512 is greater than threshold 510, and a lower power level can be used. In one embodiment, this lower power level is the lowest power level possible such that the expected SINR will result in a FER that does not exceed a specified maximum FER.

FIG. 5C shows a transmit queue 514 with a higher threshold 516 and a lower threshold 518, and with an amount of data 520. In this embodiment, higher threshold 516 is set at one-half of the maximum length of queue 514, and lower threshold 518 is set at, for example, one-quarter of the maximum length of queue 514. In this case, the amount of data 520 is below the lower threshold, so a higher power level is used. In one embodiment, this power level is maximum power.

FIG. 5D shows a transmit queue 522, corresponding to transmit queue 514, with higher threshold 524 and lower threshold 526 corresponding to higher and lower thresholds 516 and 518 respectively. In this case, however, the amount of data 528 in queue 522 is above lower threshold 526 but below higher threshold 524. Accordingly, an intermediate transmission power level is used.

FIG. 5E shows a transmit queue 530, corresponding to transmit queue 514, with higher threshold 532 and lower threshold 534 corresponding to higher and lower thresholds 516 and 518 respectively. In this case, the amount of data 536 in the queue is above higher threshold 532, so a lower power level can be used. In one embodiment, this lower power level is the lowest power level possible such that the expected SINR will result in a FER that does not exceed a specified maximum FER.

FIG. 5F shows a transmit queue 538 with a higher threshold 540 and a lower threshold 542 and with an amount of data 544. In this embodiment, higher threshold 540 is set at two-thirds of the maximum length of queue 538, and lower threshold 542 is set at one-third of the maximum length of queue 538. Contrast this policy for setting thresholds with that of FIGS. 5C-5E. In this case, the amount of data 544 is below the lower threshold, so a higher power level is used. In one embodiment, this power level is maximum power.

FIG. 5G shows a transmit queue 546, corresponding to transmit queue 538, with higher threshold 548 and lower threshold 550 corresponding to higher and lower thresholds 540 and 542 respectively. In this case, however, the amount of data 552 in queue 546 is above lower threshold 550 but below higher threshold 548. Accordingly, an intermediate transmission power level is used.

FIG. 5H shows a transmit queue 554, corresponding to transmit queue 538, with higher threshold 556 and lower threshold 558 corresponding to higher and lower thresholds 540 and 542 respectively. In this case, the amount of data 560 in the queue is above higher threshold 556, so a lower power level can be used. In one embodiment, this lower power level is the lowest power level possible such that the expected SINR will result in a FER that does not exceed a specified maximum FER.

Figure 6:
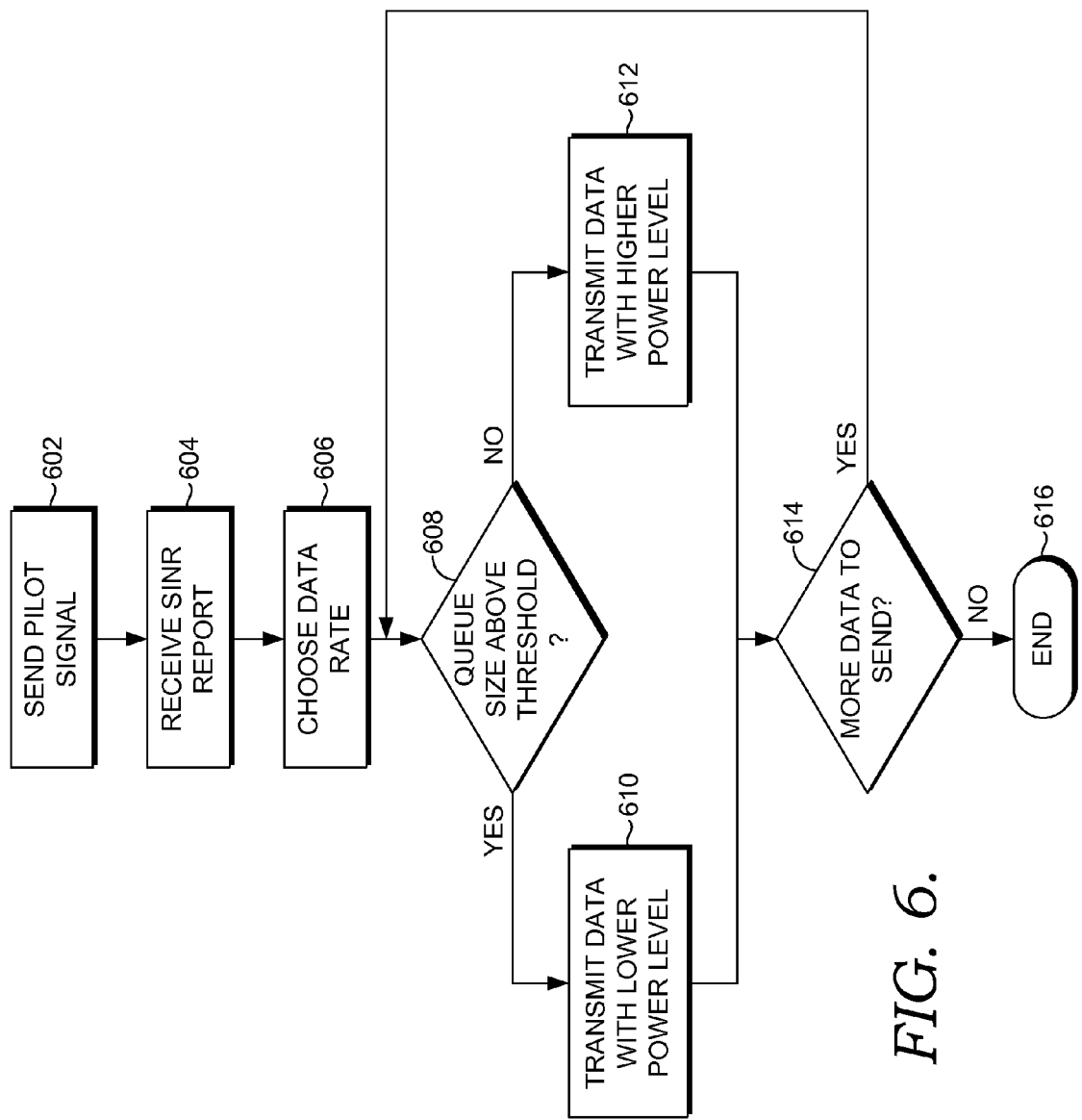
FIG. 6 depicts a flow diagram of an exemplary method in accordance with one embodiment of the present invention.

Turning now to FIG. 6, a flow diagram of an exemplary method in accordance with one embodiment of the present invention is presented. In one embodiment, this method is performed by a BTS such as BTS 106. At step 602, a pilot signal is transmitted. In one embodiment, this pilot signal is transmitted at full power. In another embodiment, this pilot signal is broadcast to all mobile devices within transmission range.

Each mobile device is programmed to, upon receiving this pilot signal, respond with a reply such as reply 214 containing a report of the SINR associated with receiving the pilot signal. In step 604, this reply is received for a specific mobile device (such as mobile device 102) with one or more associated transmission queues (such as queue 110).

Many wireless standards include multiple possible data rates, with higher data rates requiring higher SINR to be successfully received; thus, for a reported SINR, there is a highest data rate that the reported SINR can support for a target FER. For example, EVDO can support twelve distinct data rates. Upon receiving the SINR report, an appropriate data rate is then selected in step 606. In one embodiment, this data rate is the highest data rate that the reported SINR can support for a target FER.

In step 608, the amount of data (such as data amount 504) in the transmit queue from which data is to be sent (such as transmit queue 502) is determined and compared to a threshold queue length (such as threshold 506). In the embodiment shown, the amount of data in the transmit queue is only compared to a single threshold queue length, but in another embodiment, it may be compared to a plurality of thresholds.

If the amount of data in the transmit queue is above the threshold, a packet of data (such as packet 222) is transmitted with a lower power level in step 610. In one embodiment, this power level may be the lowest power level possible such that the expected SINR will result in a FER that does not exceed the target FER.

Otherwise, if the amount of data in the transmit queue is below the threshold, a packet of data is transmitted with a higher power level in step 612. In one embodiment, this power level is the maximum power level. In another embodiment, this power level is the lowest power level possible such that the expected SINR will result in a FER that does not exceed a FER specified to be lower than the target FER.

In step 614, it is determined whether data remains to be sent. In one embodiment, this is accomplished by examining the amount of data in the transmit queue to see if it is zero. In another embodiment, this may be accomplished by examining the state of the transport-layer connection to determine if it is closed or closing.

If no data remains to be sent, the connection with the mobile device is closed in step 616. Otherwise, in the illustrated embodiment, steps 608 et seq. are repeated. In another embodiment, the process may begin again by sending another pilot signal as in step 602. In yet another embodiment, the mobile device may send an SINR report for the packet sent in step 610 or 612, allowing the method to repeat from step 604.

Turning now to FIG. 7, a flow diagram of an exemplary method 700 in accordance with one embodiment of the present invention is presented. In one embodiment, this method is performed by a BTS such as BTS 106. In step 701, the current TCP state of a channel between a BTS and a mobile station is determined. The TCP state could be based on a TCP rate. The TCP rate could intrinsically include a length of a current transmit queue. In step 702, a future state of a network channel between a mobile station and the BTS is determined. According to some embodiments of the present invention, the future state of the network channel could be predicted based on a current state of the channel. For example, a current state of the network channel could be determined and a future state could be predicted based on a statistical model of network channel fluctuations. There are a number of ways channel state can be characterized. For example, an SINR could be used to characterize the state of the channel.

Additionally, a number of statistical models could be used to predict the future state of the channel, at least based on the current channel state. According to one embodiment of the present invention, a Markov Model could be used to predict the future state of the channel. Channel statistics could be modeled in terms of channel state transition probabilities, which can be used in a Markov Model to predict future channel states.

In step 703, a transmit power level is selected. The transmit power level can be selected based on the predicted future state of the channel and the current queue size. According to some embodiments of the present invention, a tradeoff factor is also used in determining the transmit power. For example, a tradeoff factor representing a tradeoff between power efficiency and channel utilization could be used in determining a transmit power level. A higher trade-off factor could result in a more aggressive reduction in transmit power. This would yield better power-efficiency, but lower channel utilization. Similarly, a lower trade-off factor could result in higher channel utilization but lower power-efficiency.

There are a number of algorithms that could be used in accordance with the present invention for selecting a transmit power level based on a TCP state and a predicted future channel state. TCP state can be determined based on a number of metrics. For example, the TCP state could be based on a TCP rate. TCP rate intrinsically includes a queue length. For example, a higher power level could be chosen if the queue length is small and the future channel state is better than the current channel state. A lower transmit power level could be chosen if the queue length is large and the future channel state is worse than the current channel state. Furthermore, the tradeoff factor could be used to select an even lower or higher power level, based on the desired tradeoff between power efficiency and channel utilization. For example, a Markovian channel state transition based algorithm could be utilized to determine a transmission power to be used in each slot as function of the current channel state and the TCP state. One embodiment of such an algorithm is as follows. Let C[t] be the current channel state and X[t] be the TCP state. The TCP state could be, for example, in terms of the TCP rate. Additionally, let Y be the instantaneous throughput and P be the transmit power. $C_i$ is the channel rate, and $p_{i,j}$ be the probability of transition to channel j. The rate-power relationship to the case when there is an n-state channel can be generalized as follows:

$$\frac{\partial \Delta Y}{\partial \Delta P[t]} = -f'(P[t])X[t]\Delta T \cdot \max\left(0, \min(X[t], C_i) - \frac{X[t]}{2}\right) - \sum_j p_{ij} f'(P[t])X[t]\Delta T \cdot (\min(X[t], C_j) - (\min(X[t], C_i))).$$

Power levels could be selected at a number of different granularities. For example, some wireless protocols divide communication into a number of different time slots. Therefore, in accordance with some embodiments of the present invention, transmit power levels could be selected on a per-slot basis. According to other embodiments of the present invention, transmit power levels could be selected on a per-round-trip-time basis, where a round-trip time is the time it takes a packet to be sent to a receiver and an acknowledgement to be received. In step 704, the data is transmitted using the selected transmit power.

Turning now to FIG. 8, a flow diagram of an exemplary method of predicting a future channel state 800 in accordance with one embodiment of the present invention is presented. In one embodiment, this method is performed by a BTS such as BTS 106. In step 801, a pilot signal is transmitted. A pilot signal can be transmitted to a mobile device from the BTS. This pilot signal could be used by the mobile device to determine a current SINR related to the channel between the BTS and the mobile station that is being used for communication. This determined SINR can be transmitted from the mobile station to the BTS. In step 802, the BTS receives the SINR.

The BTS can utilize the SINR to determine a current state of the communication channel in step 803. This current channel state can be then used to predict a future channel state, in step 804. For example, a statistical model can be used to predict a future channel state based on the current channel state. According to some embodiments of the present invention, a Markov Model could be used to predict a future channel state from a current channel state.

Figure 9:
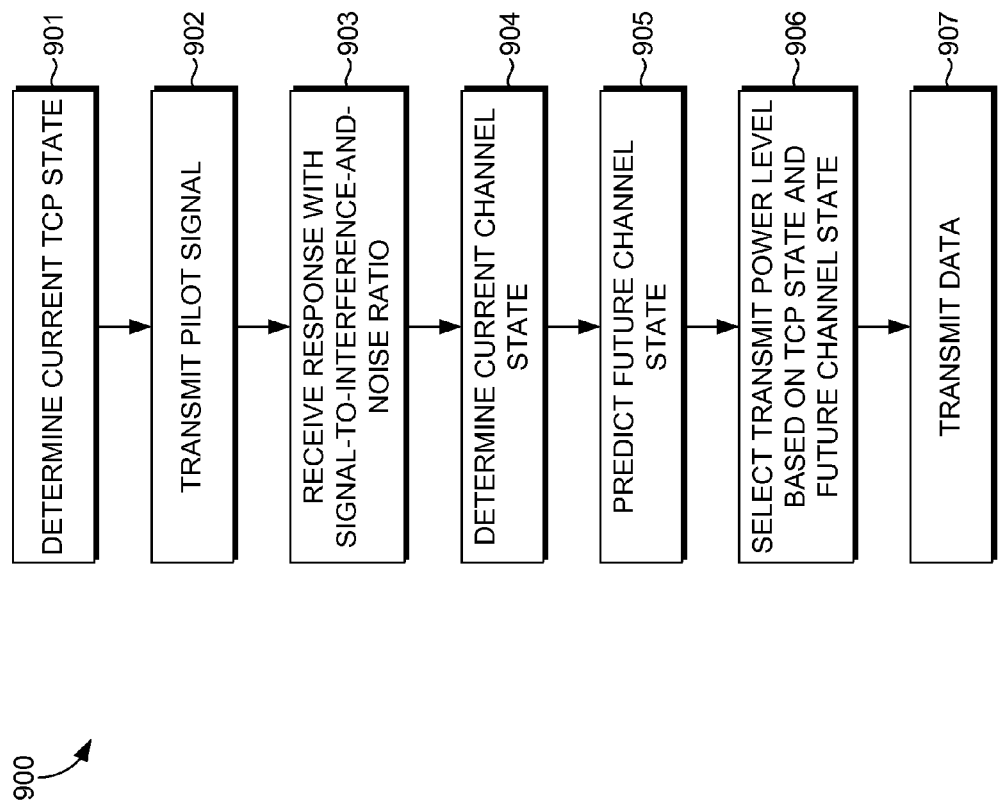
FIG. 9 depicts a flow diagram of an exemplary method of transmitting data at a particular power level in accordance with an embodiment of the present invention.

Turning now to FIG. 9, a flow diagram of an exemplary method 900 of selecting a transmit level in accordance with embodiments of the present invention is presented. In step 901, a current TCP state is determined. As discussed above, the TCP state could be determined by a TCP rate for a TCP flow between a BTS and a mobile station. In step 902, a pilot signal is transmitted. According to some embodiments of the invention, the pilot signal could be transmitted from a BTS to a mobile station using a communication channel used to support a TCP connection.

In step 903, a response prompted by the pilot signal is received by the BTS. For example, the response could contain an SINR, which can be used to characterize a current channel state. In step 904, a current channel state is determined. For example, the current channel state could be determined based on the received SINR value.

In step 905, a future channel state is predicted. According to some embodiments of the invention, a Markov Model could be used to predict the future channel state based on the current channel state. According to other embodiments of the invention, other channel models could be used to predict the future channel state.

In step 906, a transmit power level is selected. According to some embodiments of the invention, the transmit power level can be selected based on the TCP state and the predicted future state of the network. According to other embodiments of the invention, the transmit power level could be selected based on additional information, such as a tradeoff factor. For example, the tradeoff factor could represent a tradeoff between channel utilization and power efficiency. In step 907, data is transmitted. For example, data could be transmitted between the BTS and the mobile station using the selected transmit power level.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Computer-readable media having computer-executable instructions embodied thereon that, when executed, facilitate a method of controlling power usage in a wireless telecommunications network, the method comprising:
   determining a current TCP state;
   predicting a future channel state of a wireless channel for communicating to a mobile station;
   selecting a transmit power level for a subsequent data transmission to said mobile station based at least on said current TCP state and said future channel state; and
   transmitting data to said mobile station at said transmit power level.

2. The media of claim 1, wherein predicting said future channel state includes:
  determining a current channel state of said wireless channel; and
  predicting said future channel state based on said current channel state.

3. The media of claim 2, wherein determining said current channel state includes:
  transmitting a pilot signal to a mobile station using the wireless channel;
  receiving a response that includes a signal-to-interference-and-noise ratio associated with said pilot signal; and
  determining said current channel state based on said signal-to-interference-and-noise ratio.

4. The media of claim 2, wherein predicting said future channel state includes utilizing a statistical model to predict said future channel state based on said current channel state.

5. The media of claim 4, wherein said statistical model is a Markov Model.

6. The media of claim 1, wherein selecting a transmit power level includes selecting said transmit power level based on a tradeoff factor.

7. The media of claim 6, wherein the tradeoff factor trades off power efficiency for channel utilization.

8. The media of claim 1, selecting said transmit power level includes selecting said transmit power level on a per-slot basis.

9. The media of claim 1, wherein selecting said transmit power level includes selecting said transmit power level on a per-round-trip-time basis.

10. The media of claim 1, wherein said wireless channel communicates data by way of one or more of the following technologies:
  CDMA;
  GSM;
  EVDO;
  HSPDA;
  LTE;
  WiFi; or
  WiMax.

11. The media of claim 1, wherein the current TCP state is a TCP rate.

12. The media of claim 2, wherein:
  the power level is a lower power level than a current power level if said current TCP state includes a queue length that is large and said future channel state is worse than said current channel state; and
  the power level is a higher power level than a current power level if said current TCP state includes a queue length that is small and said future channel state is better than said current channel state.

13. A base transceiver station, comprising:
  a processing unit; and
  a computer-readable media embodied with computer-executable instructions that, when executed, perform the following steps:
    determining a current TCP state;
    predicting a future channel state of a wireless channel for communicating to a mobile station; and
    selecting a transmit power level for a subsequent data transmission to said mobile station based at least on said current TCP state and said future channel state; and
    transmitting data to said mobile station at said transmit power level.

14. The base transceiver station of claim 13, wherein the predicting said future channel state includes:
  determining a current channel state of said wireless channel; and
  predicting said future channel state based on said current channel state.

15. The base transceiver station of claim 14, wherein determining said current channel state includes:
  transmitting a pilot signal to a mobile station using the wireless channel;
  receiving a response that includes a signal-to-interference-and-noise ratio associated with said pilot signal; and
  determining said current channel state based on said signal-to-interference-and-noise ratio.

16. The base transceiver station of claim 15, wherein predicting said future channel state includes utilizing a statistical model to predict said future channel state based on said current channel state.

17. The base transceiver station of claim 16, wherein said statistical model is a Markov Model.

18. Computer-readable media having computer-executable instructions embodied thereon that, when executed, facilitate a method of controlling power usage in a wireless telecommunications network, the method comprising:
  determining a current TCP state;
  transmitting a pilot signal to a mobile station using the wireless channel;
  receiving a response that includes a signal-to-interference-and-noise ratio associated with said pilot signal;
  determining a current channel state based on said signal-to-interference-and-noise ratio;
  predicting a future channel state of a wireless channel for communicating to a mobile station based on said current state and a Markov Model;
  selecting a transmit power level for a subsequent data transmission to said mobile station based at least on said current TCP state, said future channel state, and a tradeoff factor; and
  transmitting data to said mobile station at said transmit power level.

19. The media of claim 18, wherein selecting a transmit power level includes selecting said transmit power level based on a tradeoff factor.

20. The media of claim 18, wherein said wireless channel communicates by way of one or more of the following technologies:
  CDMA;
  GSM;
  EVDO;
  HSPDA;
  LTE;
  WiFi; and
  WiMax.

* * * * *